O. G. WORSLEY.
VEHICLE WHEEL.
APPLICATION FILED MAY 25, 1911.
1,020,338. Patented Mar. 12, 1912.
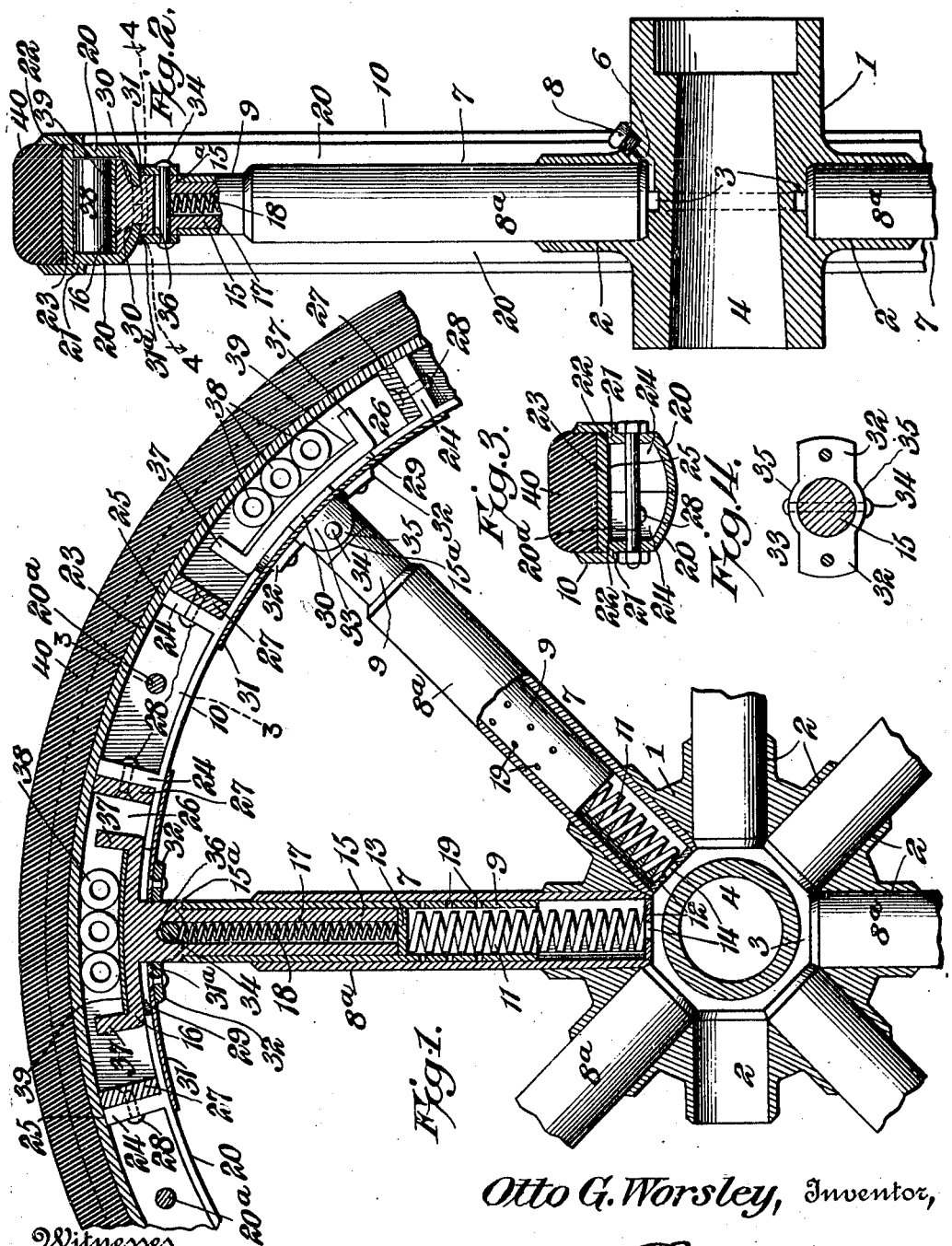
Otto G. Worsley, Inventor,
By E. G. Siggers
Attorney
Witnesses
Howard N. Orr
H. T. Riley

UNITED STATES PATENT OFFICE.

OTTO G. WORSLEY, OF BANGOR, MICHIGAN.

VEHICLE-WHEEL.

1,020,338.   Specification of Letters Patent.   Patented Mar. 12, 1912.

Application filed May 25, 1911. Serial No. 629,455.

*To all whom it may concern:*

Be it known that I, OTTO G. WORSLEY, a citizen of the United States, residing at Bangor, in the county of Van Buren and State of Michigan, have invented a new and useful Vehicle-Wheel, of which the following is a specification.

The invention relates to improvements in vehicle wheels.

The object of the present invention is to improve the construction of vehicle wheels, more especially that shown and described in Patent, No. 977,846 granted to me Dec. 6, 1910, and to provide a simple, efficient and comparatively inexpensive cushioned wheel, adapted to noiselessly absorb all the shocks and jars incident to the travel of the same when used as a driver for motor vehicles, and capable of producing a gradual starting of the vehicle conducive to a longer wear of the same and greater comfort to the occupants thereof.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a longitudinal sectional view of a portion of the cushioned wheel, constructed in accordance with this invention. Fig. 2 is a transverse sectional view, a portion of the spoke being in elevation. Fig. 3 is a detail sectional view on the line 3—3 of Fig. 1. Fig. 4 is a detail sectional view on the line 4—4 of Fig. 2.

Like numerals of reference designate corresponding parts in all the figures of the drawing.

In the accompanying drawing in which is illustrated the preferred embodiment of the invention, 1 designates a metallic hub provided at intervals with radial spoke sockets 2, and having an annular groove 3 surrounding the axle receiving opening 4 and communicating with the spoke sockets 2. The hub is preferably constructed of malleable metal, and the annular groove may be cored or otherwise formed in the same, and a lubricant passage 6 extends from the annular groove 3 to the exterior of the hub to permit oil, graphite, or other lubricant to be supplied to the annular groove for lubricating the spokes 7, as hereinafter fully described. The passage 6 for the introduction of the lubricant is short and is arranged at an inclination at the outer side of one of the spoke sockets, as clearly illustrated in Fig. 2 of the drawing, and it is interiorly threaded at the outer end for the reception of a screw plug 8, which is preferably in the form of a thumb screw, as shown.

The spokes 7 comprise in their construction exterior tubes or members 8ª and interiorly arranged tubes or members 9, constructed of steel or other suitable material and telescoping into the exterior tubes or members 8ª and connected with a hollow rim 10 of the wheel. The inner ends of the exterior tubes or members 8ª are suitably secured within the radial sockets 2 of the hub, and the inner tubes or members 9 are cushioned by coiled springs 11, arranged within the outer tubular members 8ª of the spokes and interposed between inner plates or seats 12 and outer follower plates 13, which are carried by the inner tubular members of the spokes. The inner plates or seats 12, which are circular to conform to the configuration of the outer tubular members 8ª of the spokes, are preferably arranged within the inner ends of the same, as shown, and when the said outer members 8ª are fitted in the spoke sockets 2, the inner plates or seats 12 fit against the bottom of the said sockets 2 and span the annular lubricant groove 3 and form an outer wall for the same. The plates or seats 12 are provided with central perforations 14, forming communications between the annular lubricant groove and the interior of the spokes, and permitting the passage of the lubricant from the grooves 3 to the spokes. The rotation of the wheel causes the lubricant to flow through the openings 14 into the interior of the spokes 7. When the spokes and the inner plates or seats are removed from the spoke sockets 2, access is thereby afforded to the lubricant passage, which may then be easily cleaned. Also this specific construction enables the hub to be easily cast.

The follower plates 13 normally fit against the inner end of the tubular shanks 15 of the bearing heads 16. The tubular shanks have bores or openings 17, extending longitudinally of the tubular shanks from the inner ends thereof to within a short distance of the bearing heads 16 and receiving and housing coiled expansion springs 18, which are adapted to bear against the follower plates 13 which are in constant contact with the outer ends of the coiled cushioning springs 11. When the parts are in normal positions and conditions, the heavy cushioning springs 11 are substantially at the limit of their expansion so that their pressure on the inner sides of the follower plates 13 is just sufficient to maintain said plates against the inner ends of the tubular shanks 15, such pressure being greater but not excessively greater than that of the lighter expansion springs 18 which are under compression to a much greater extent and bearing against the opposite or outer faces of said follower plates. When, however, the wheel passes over bumps or rough places, and suddenly drops and rises, quickly compressing and then quickly relieving the springs 11, the lighter expansion springs 18 moving more quickly than the heavier cushioning springs 11 will always maintain the follower plates in contact with said springs 11 and thus prevent rattling and noise which would occur without said expansion springs and always maintaining the follower plates closely held between the springs and in proper position relative to the inner members of the spokes, in which they are slidably seated, thus preventing possible displacement, turning, or rattling during the quick actions of the members.

The inner portions of the inner tubular members 9 of the spokes are provided at intervals with perforations 19 for the passage of lubricant for lubricating the contiguous bearing faces of the inner and outer tubular members 8ª and the outer faces of the inner tubular members 9 to be thoroughly lubricated by the lubricant introduced into the annular groove 3 of the hub.

The rim of the wheel is composed of two annular complemental sections 20, forming an approximately U-shaped rim and provided at their sides with angular bends or off-sets 21, forming interior annular shoulders or seats 22 for a resilient metallic band 23. The sections 20 are also provided at intervals with transverse webs or lugs 24, having meeting edges abutting against each other and provided with outer transverse edges 25, arranged in flush relation with the annular shoulders or seats 22 and co-acting with the same in supporting the metallic band 23. The transverse lugs or webs 24, which are radially arranged, form spaces 26 to receive the bearing heads, and they are equipped with transverse buffers 27, extending across the space within the rim and arranged to be engaged by the bearing heads to prevent noise and jar. Rubber or any other suitable material may be employed in the construction of the transverse buffers or cushions, which are secured to the lugs or webs 24 by rivets 28, or other suitable fastening devices. The rim sections are secured together by transverse bolts 20ª, piercing the opposite sides of the rim sections at points between the interior annular shoulders or seats 22 and the inner edges of the sections, and located in the spaces between the transverse webs occurring at points between the spokes. The rim sections are provided with opposite coincident recesses 29, forming longitudinal slots or openings through which the shanks 15 extend, and the said shanks are provided at opposite sides with grooves 30, receiving the edges of the rim sections at the longitudinal openings. The longitudinal openings are covered by sheet metal plates 31, which exclude dust, water and other accumulation from the interior of the rim. The plates, which have openings 31ª to receive the shanks of the bearing heads, are secured by rivets, or other suitable fastening devices to projecting flanges 32 of collars 33, fitted on the shanks 15 and secured to the same by transverse rivets or pins 34, which pass through ears 35 of the collars 33. The openings 36 in the shanks are elongated or elliptical to provide a limited play of the parts, and the outer ends of the expansion springs 18 fit against the rivets or pins 34, as clearly illustrated in Fig. 1 of the drawing, whereby the plates 31 are yieldingly held in contact with the inside of the hollow rim 10, directly by the pressure of the spring 18 which spring thus performs the double function of always holding the follower plates 13 against the springs 18 and always maintaining a yielding contact between plates 31 and the rim.

The shanks 15 are suitably secured within the inner tubular members, and are reduced to form shoulders 15ª to fit against the outer ends of the said inner tubular members. The bearing heads, which are located within the spaces 26 of the rim, extend longitudinally thereof and are provided at their ends with walls or lugs 37, which form stops for a plurality of anti-friction rollers 38, arranged in the space or recess between the end lugs or walls 37, there being sufficient space between the end walls to permit free play of the rollers 38. The rollers 38 are preferably hollow, as shown, and the bearing head is equipped with a plate 39, constructed of steel or other suitable material and extending the entire length of the recess of the bearing heads.

The anti-friction rollers 38 facilitate the longitudinal movement of the bearing heads within the rim, the movement being limited by the end lugs or walls 37 of the heads engaging with the transverse buffers or cushions 27. The movement of the bearing heads longitudinally of the rim provides for an easy stopping and starting of a motor vehicle or similar machine, and the cushioned telescopic action of the spokes absorbs the jars and shocks. When the wheel is employed as a driver, the hub and the spokes move independently of the rim until the bearing heads engage the transverse buffers at the ends of the spaces 26. This engagement causes the rim to travel with the spokes and the hub, and the transverse buffers prevent noise and absorb the jar incident to the contact of the bearing heads with the lugs or webs of the rim.

The wheel is equipped with a solid rubber tire 40, seated on the metallic band 23 and arranged between the outer portions of the sides of the rim sections, which project beyond the band, as clearly shown in Figs. 2 and 3 of the drawing. Any form of tire may be employed, as the cushioning action of the springs renders the wheel resilient and obviates the necessity of employing pneumatic tires.

Having thus fully described my invention, what I claim as new and desire to secure by Letters Patent, is:—

1. A wheel comprising a hub provided with spoke sockets, outer tubular spoke members in said sockets, inner tubular members telescopingly mounted in said outer members, hollow shanks secured to the inner members, a rim connected to the shanks, follower plates in the inner telescoping members against the inner ends of the shanks, cushioning springs between the follower plates and the hub, and lighter expansion springs in the shanks bearing on the outer faces of the follower plates.

2. A wheel including a hub, spokes secured at their inner ends to the hub and composed of inner and outer telescopic members, bearing heads having tubular shanks fitted within the said tubular members and having longitudinal bores or openings extending from the inner ends of the shanks and terminating short of the bearing heads, follower plates fitted against the inner ends of the tubular shanks, cushioning springs housed within the spokes and bearing at their outer ends against the follower plates, expansible springs arranged with the tubular shanks and bearing against the follower plates for maintaining the same in contact with the said cushioning springs, and a rim connected with the bearing heads.

3. A wheel comprising a hollow rim having longitudinal slots in its inner wall, a spoke comprising a hollow tubular shank projected through each of said slots and provided with a transverse radially elongated slot, a bearing head inside the rim carried on the outer end of the shank, a collar on the shank inside of the inner wall of the rim, a plate carried by said collar bearing against the rim, a pin passing through the collar and through the slot in the shank with play in the latter, and a spring in the hollow of the shank pressing outward against the pin.

4. A wheel comprising a hub, a spoke having hollow telescoping sections, and a hollow shank in the inner telescoping section, a head on the outer end of the shank, a hollow rim in which said head is seated and provided with a longitudinal slot to receive the hollow shank, a plate mounted on the shank bearing on the inner side of the rim, a transverse pin loosely engaging the shank and connected to said plate, a follower plate in the hollow spoke, a cushioning spring bearing outwardly against said follower plate, and an expansion spring bearing inwardly against the follower plate to maintain it always in contact with the cushioning springs, and pressing outwardly against the pin carried by the plate mounted on the shank to maintain said plate always in contact with the rim.

5. A wheel including a hub, spokes connected at their inner ends with the hub and provided at their outer ends with bearing heads and having side grooves arranged adjacent to the bearing heads, means for pressing the bearing heads outward, a hollow rim composed of annular sections fitted together and provided at their meeting edges with recesses forming openings through which the spokes extend, the edges of the rim at the recesses fitting in the side grooves of the spokes, collars secured on the spokes and having projecting flanges, plates mounted on the spokes and secured to the flanges of the collars and arranged to cover the said openings, means to yieldingly press the plates into engagement with the rim, and antifriction devices carried by the bearing heads and fitted against the rim.

6. A wheel including spokes provided with bearing heads, a hollow rim receiving the bearing heads and composed of annular sections and provided at opposite sides with angular bends forming interior annular shoulders, said sections being also provided with transverse webs having outer edges arranged in flush relation with the shoulders, a metallic band supported upon the lugs and the shoulders, and an elastic tire seated upon the band between the sections of the rim.

In testimony, that I claim the foregoing as my own, I have hereto affixed my signature in the presence of two witnesses.

OTTO G. WORSLEY.

Witnesses:
  CHAS. E. CROSS,
  WALTER E. WILCOX.